US006422466B1

(12) United States Patent
Dickson et al.

(10) Patent No.: US 6,422,466 B1
(45) Date of Patent: Jul. 23, 2002

(54) METHOD OF AND SYSTEM FOR AUTOMATICALLY IDENTIFYING PACKAGES DURING PACKAGE TRANSPORT OPERATIONS CARRIED OUT BY A HUMAN OPERATOR WALKING THROUGH THE DOORWAY OF A STORAGE CONTAINER

(75) Inventors: LeRoy Dickson, Morgan Hill; John Groot, San Jose, both of CA (US); Carl Harry Knowles, Morristown; Thomas Amundsen, Turnersville, both of NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 09/479,435

(22) Filed: Jan. 7, 2000

Related U.S. Application Data

(63) Continuation of application No. 08/886,806, filed on Apr. 22, 1997, now Pat. No. 5,984,185, which is a continuation of application No. 08/726,522, filed on Oct. 7, 1996, now Pat. No. 6,073,846, and a continuation-in-part of application No. 08/615,054, filed on Mar. 12, 1996, now Pat. No. 6,286,760, and a continuation of application No. 08/573,949, filed on Dec. 18, 1995, now abandoned, and a continuation-in-part of application No. 08/561,479, filed on Nov. 20, 1995, now Pat. No. 5,661,292, and a continuation-in-part of application No. 08/476,069, filed on Jun. 7, 1995, now Pat. No. 5,591,953, and a continuation of application No. 08/475,376, filed on Jun. 7, 1995, now Pat. No. 5,637,852, and a continuation of application No. 08/439,224, filed on May 11, 1995, now Pat. No. 5,627,359, and a continuation of application No. 08/293,695, filed on Aug. 19, 1994, now Pat. No. 5,468,951, and a continuation of application No. 08/292,237, filed on Aug. 17, 1994, now Pat. No. 5,808,285, and a continuation of application No. 08/293,493, filed on Aug. 19, 1994, now Pat. No. 5,525,789.

(51) Int. Cl.$^7$ .................................................. G06K 7/10
(52) U.S. Cl. .............................. 235/462.01; 235/462.34
(58) Field of Search ....................... 235/462.01–462.49; 382/50, 68, 69

(56) References Cited

U.S. PATENT DOCUMENTS 4,026,630 A 5/1977 Wollenmann 4,113,343 A 9/1978 Vladimir et al.

(List continued on next page.)

FOREIGN PATENT DOCUMENTS

| DE | 3421705 A | 4/1986 | |
|----|-----------|--------|-|
| EP | 0 731 417 A2 | 11/1996 | ............ G06K/7/10 |

(List continued on next page.)

OTHER PUBLICATIONS

Holoscan Model 2100 Scanner by Holoscan, et al., Holoscan, Inc., vol. 0, No. 0, 1994.

(List continued on next page.)

*Primary Examiner*—Thien M. Le
(74) *Attorney, Agent, or Firm*—Thomas J. Perkowski, Esq., P.C.

(57) ABSTRACT

A method of and system for automatically identifying packages during package transport operations carried out by a human operator walking through the doorway of a storage container parked up to a loading dock, wherein a laser scanning system is supported above the doorway defining a passageway of 3-D spatial extent, through which a human operator may walk while manually transporting packages bearing bar code symbols. In the illustrative embodiment, the laser scanning system includes a housing having a light transmission aperture, and a laser scanning pattern generator disposed within the housing. During operation of the system, the laser scanning pattern generator employs a holographic scanning disc to project through the light transmission aperture, an omnidirectional laser scanning pattern which is substantially confined within the spatial extent of a predefined 3-D scanning volume that spatially encompasses a substantial portion of the passageway. As each package bearing a bar code symbol is transported through the doorway as the human operator walks through the doorway, the package is automatically identified by the laser scanning system supported above the doorway. By virtue of the present invention, a bar coded package can now be automatically identified as a human operator holding the package walks through the doorway of a storage container, thus improving inventory control accuracy and worker productivity.

16 Claims, 152 Drawing Sheets

Warehouse Sortation

U.S. PATENT DOCUMENTS

Figure 1A:
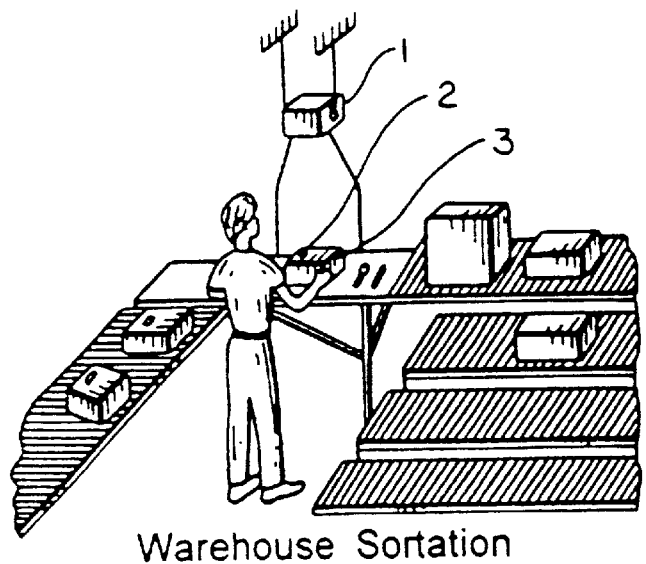
Figure 1B:
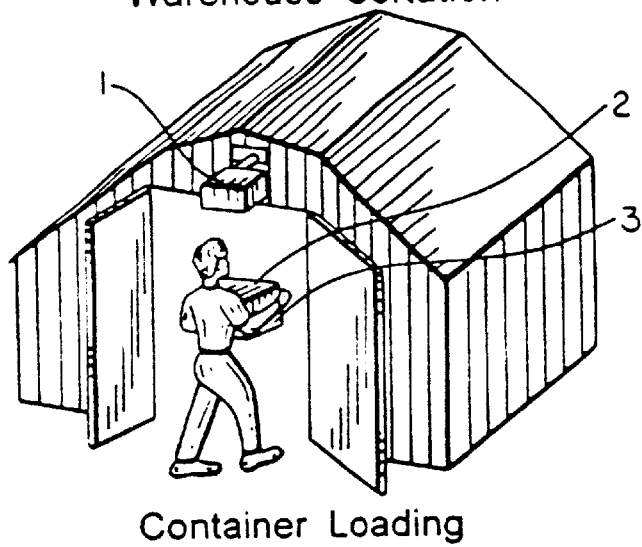
Figure 1C:
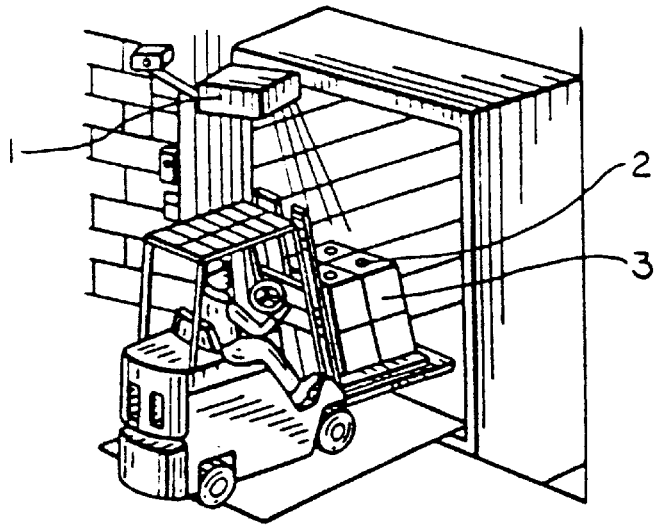
Figure 2A:
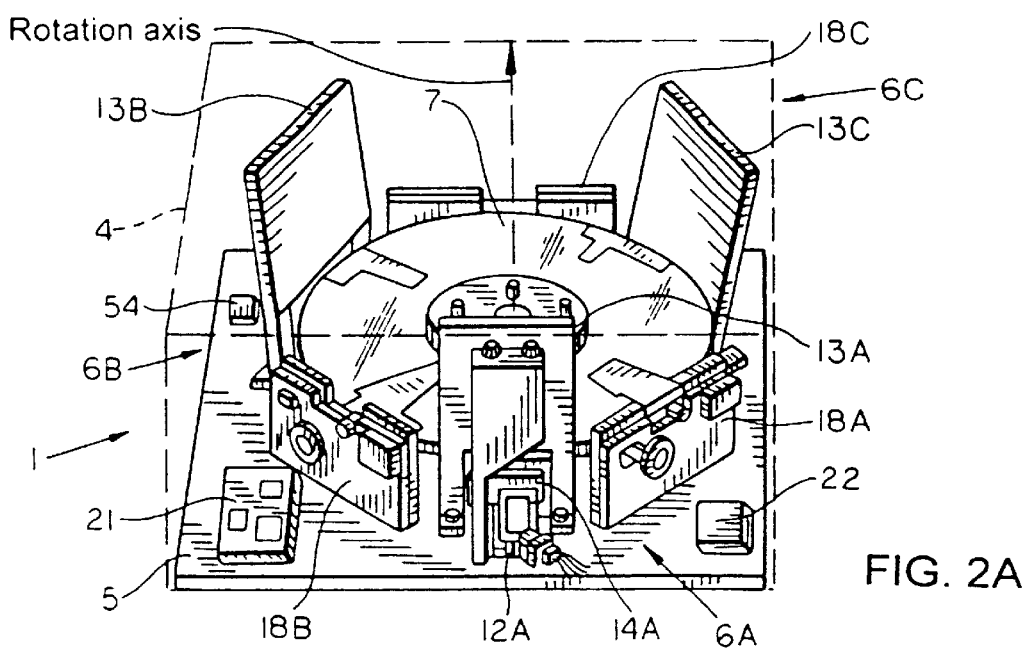
Figure 2B:
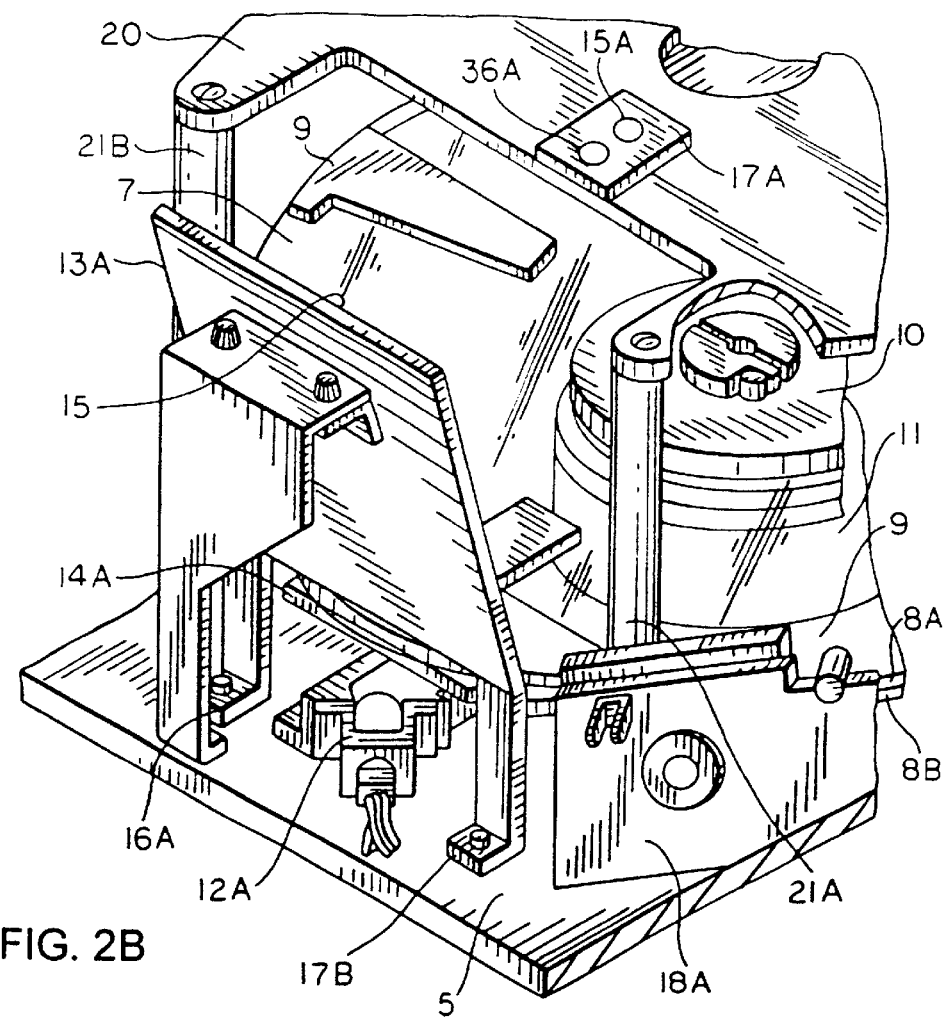
Figure 2C:
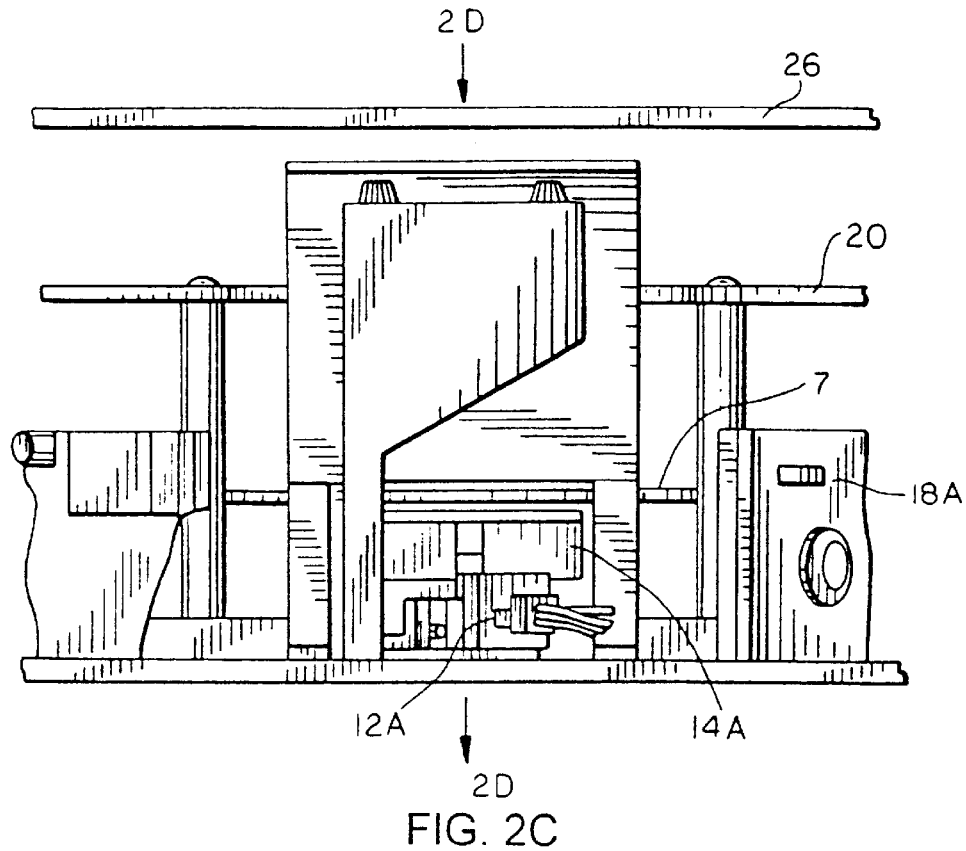
Figure 2D:
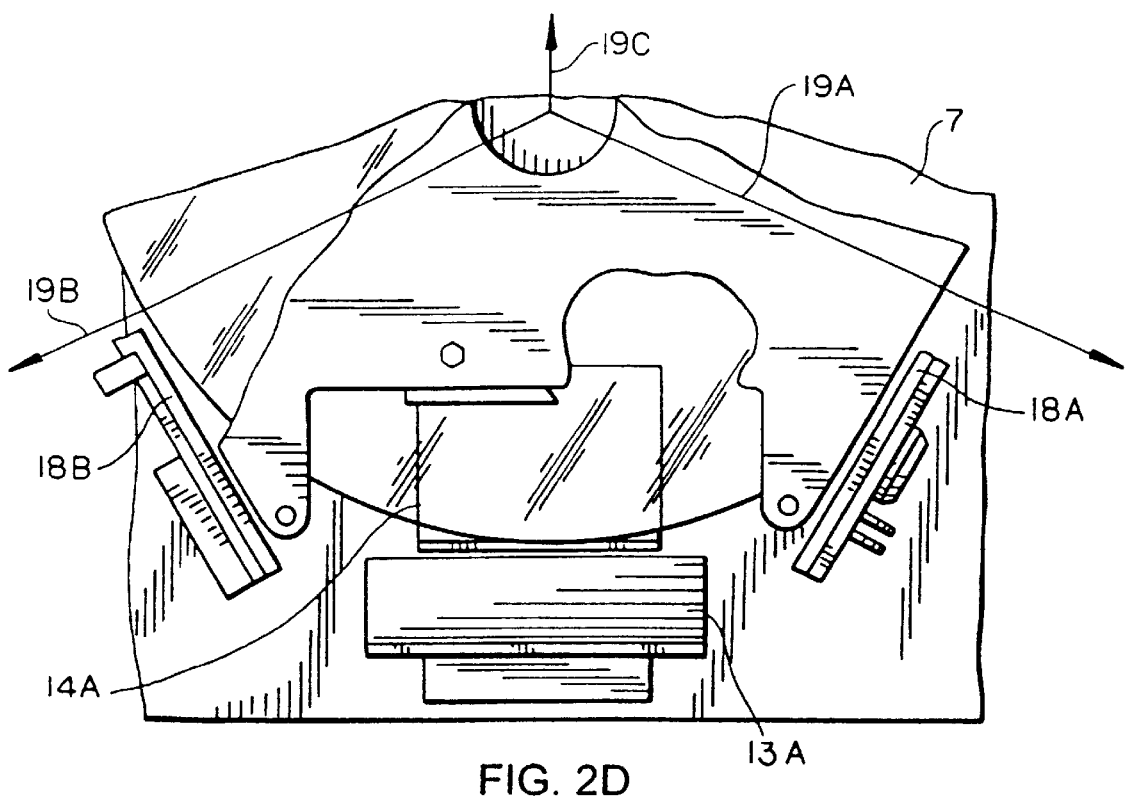
Figure 2E:
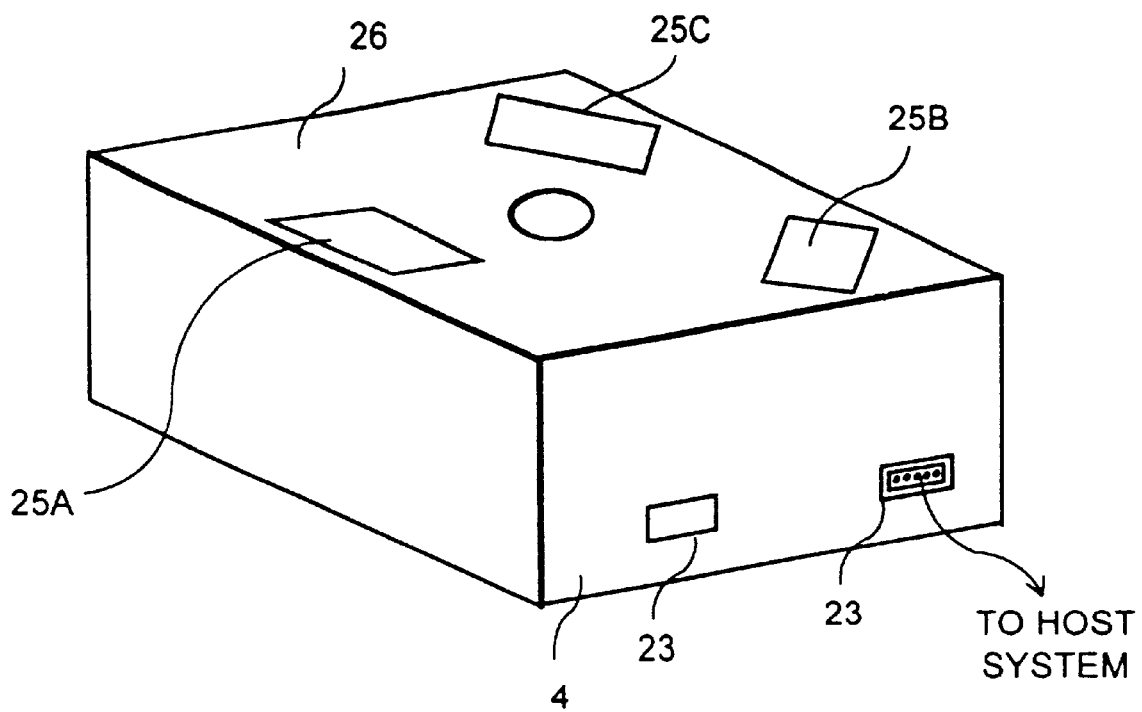
Figure 3:
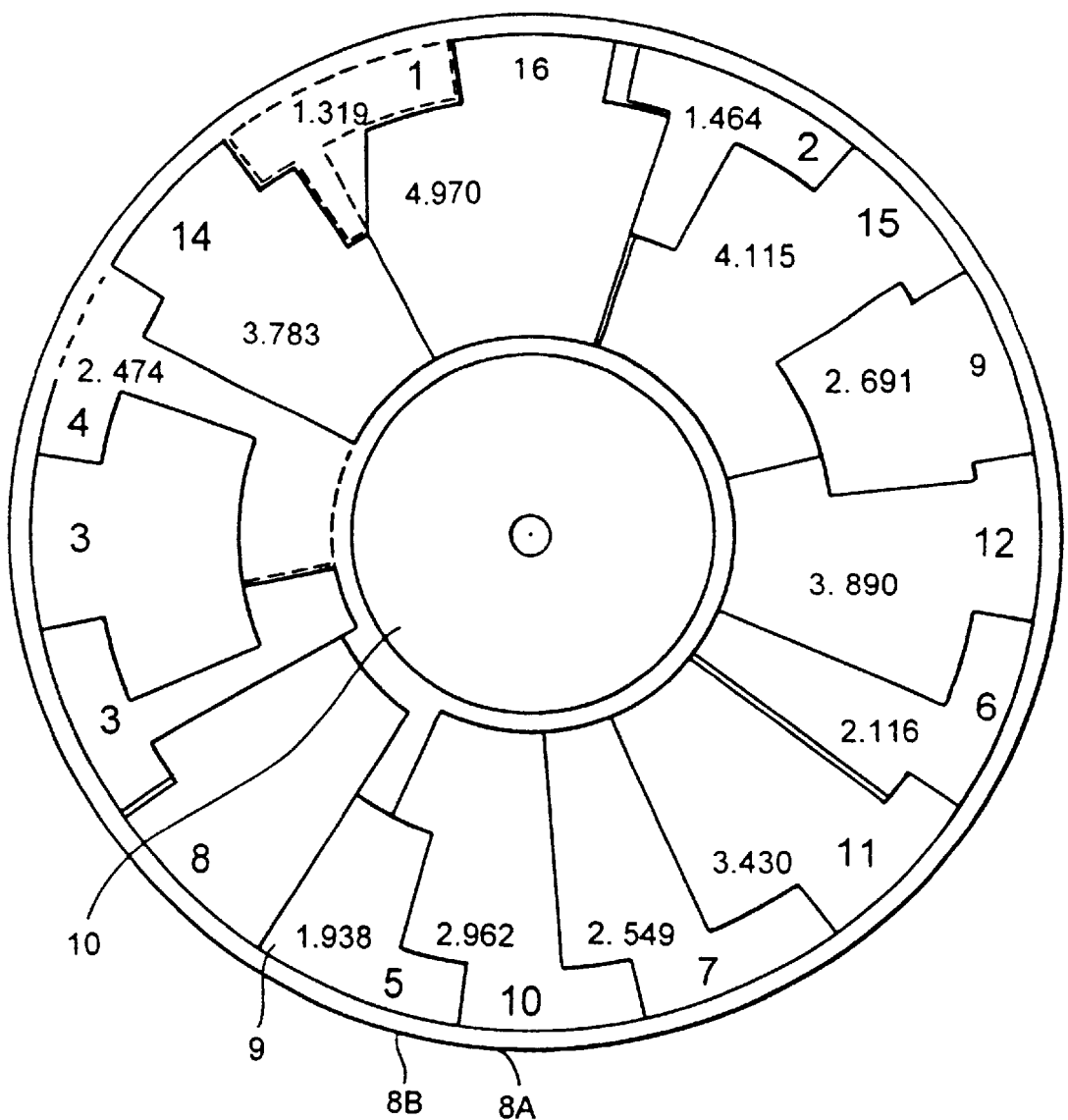
Figure 4A:
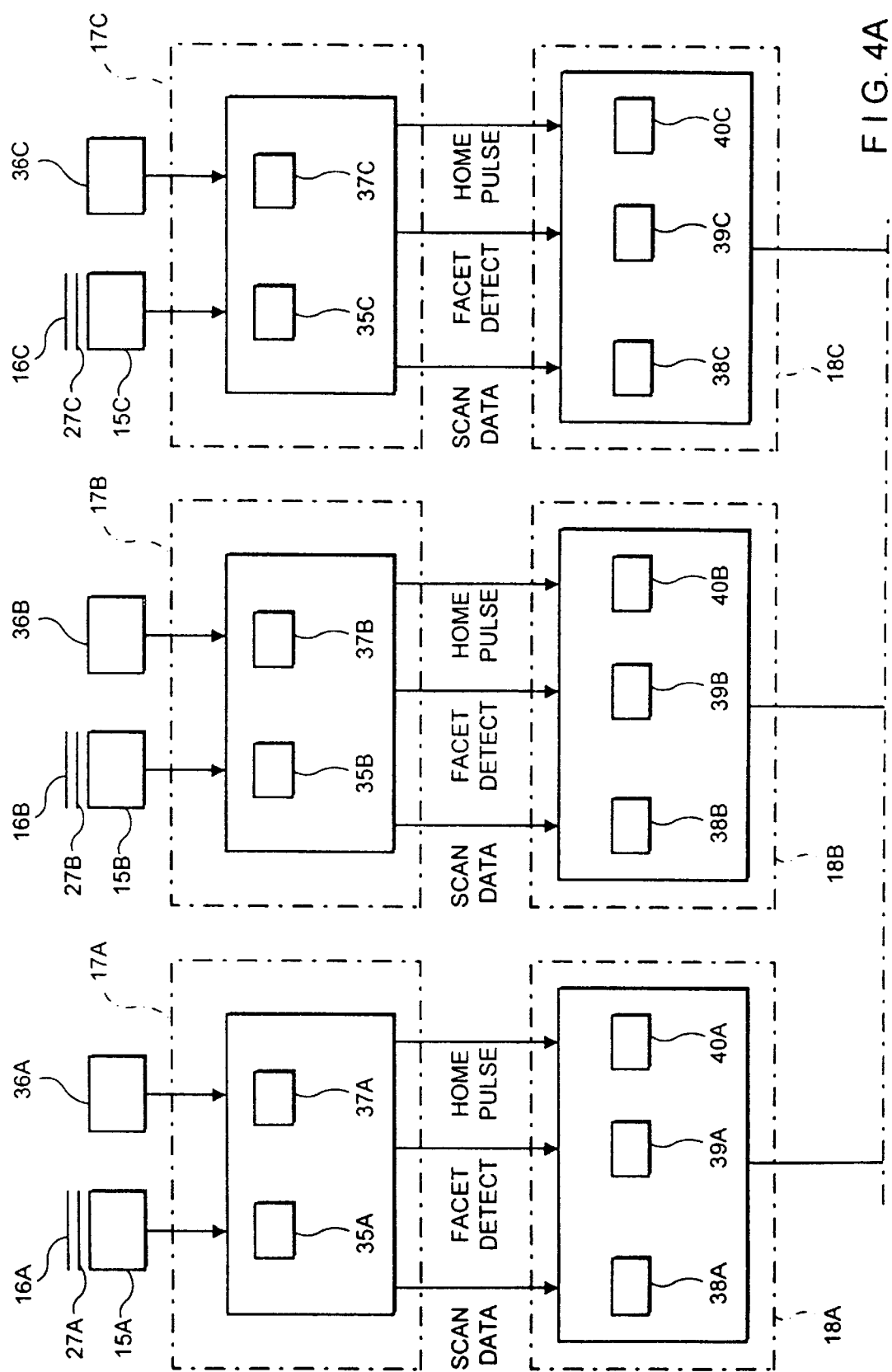
Figure 4B:
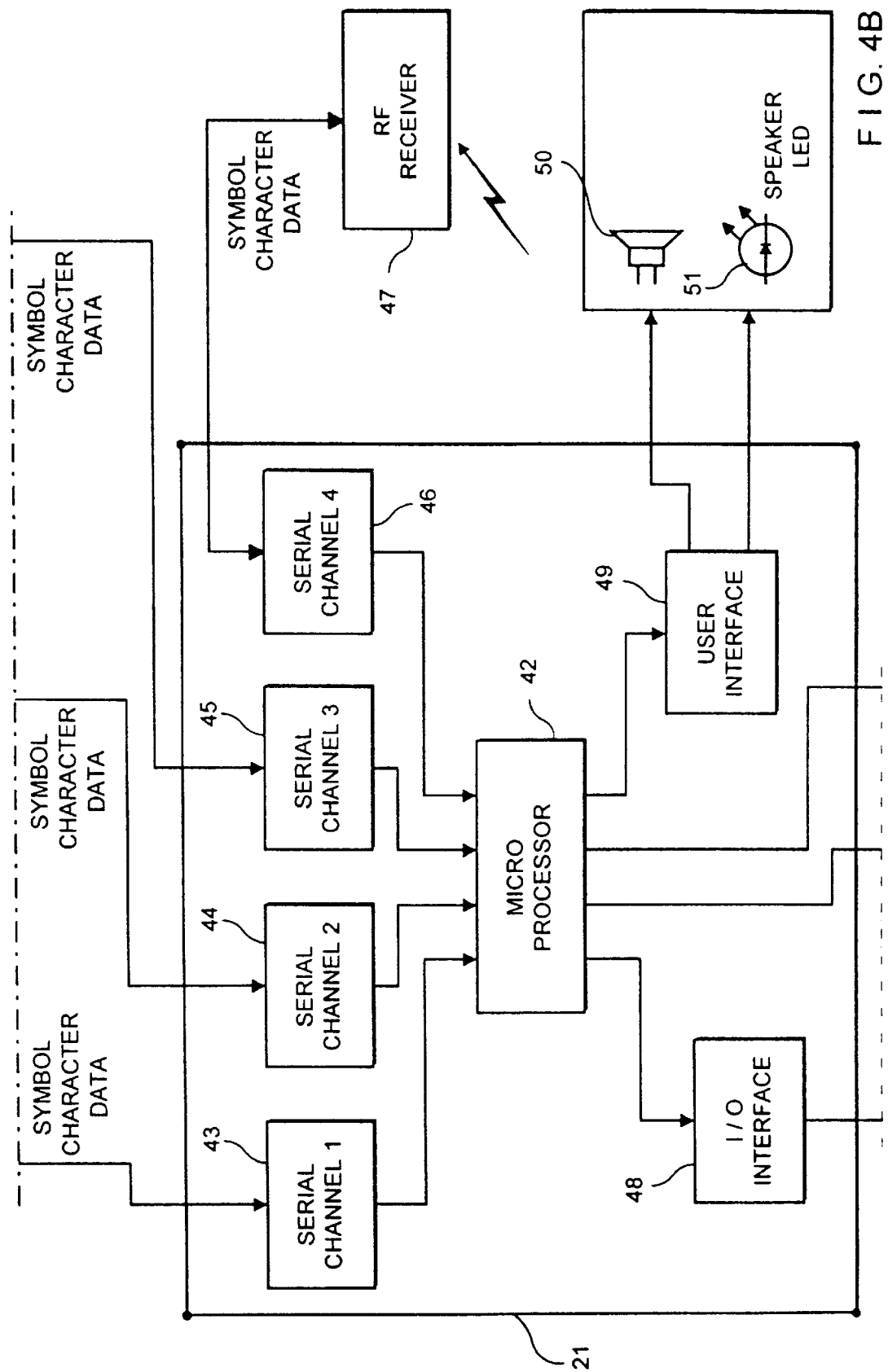
Figure 4C:
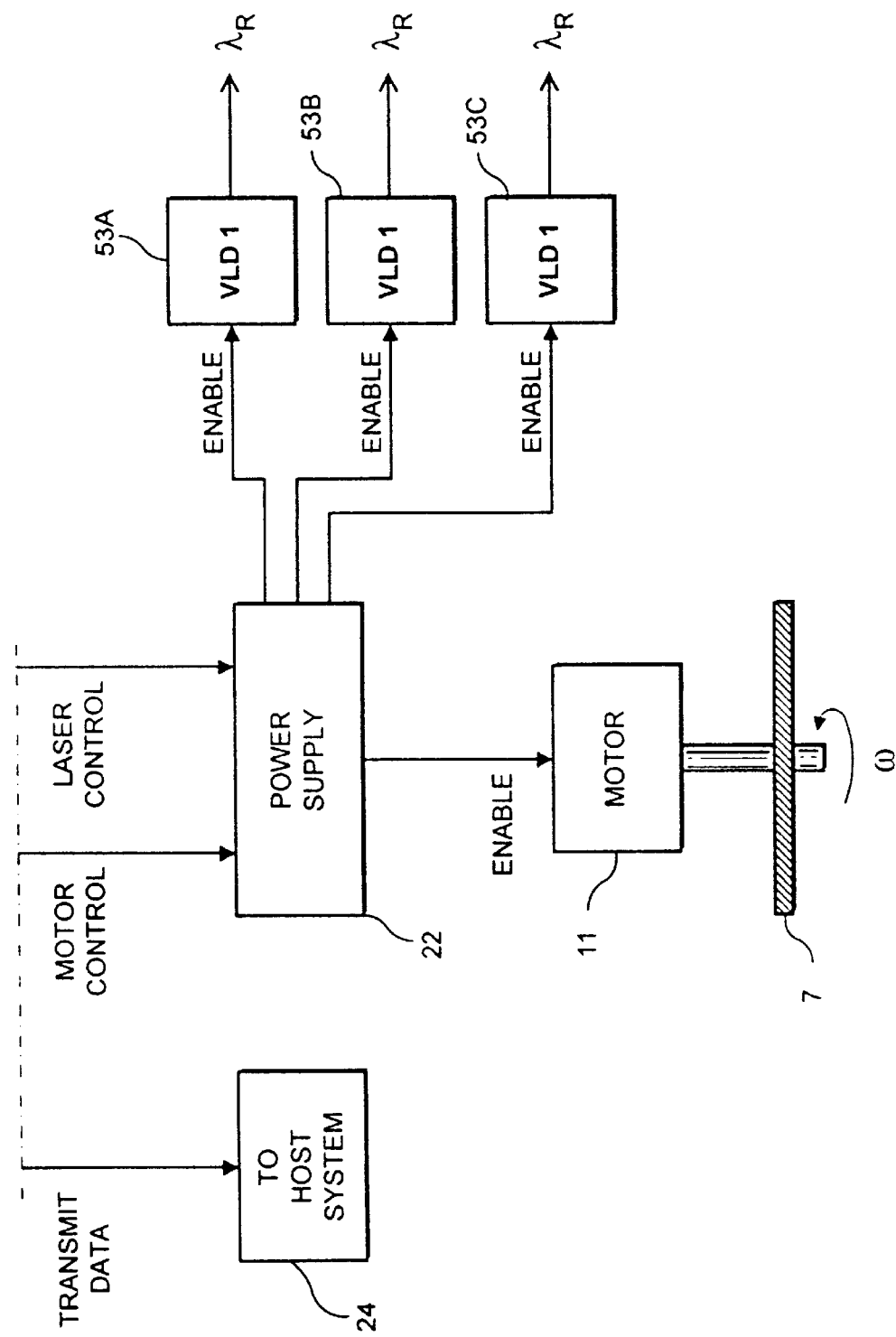

| | | | |
|---|---|---|---|
| 4,243,293 A | | 1/1981 | Kramer |
| 4,333,006 A | | 6/1982 | Gorin et al. |
| 4,364,627 A | | 12/1982 | Haines |
| 4,378,142 A | | 3/1983 | Ono |
| 4,415,224 A | | 11/1983 | Dickson |
| 4,416,505 A | | 11/1983 | Dickson |
| 4,428,643 A | | 1/1984 | Kay |
| 4,429,946 A | | 2/1984 | Haines |
| 4,548,463 A | | 10/1985 | Cato et al. |
| 4,591,236 A | | 5/1986 | Broockman et al. |
| 4,591,242 A | | 5/1986 | Broockman et al. |
| 4,610,500 A | | 9/1986 | Kramer |
| 4,742,555 A | * | 5/1988 | Tonkin .................. 382/50 |
| 4,748,316 A | | 5/1988 | Dickson |
| 4,753,502 A | | 6/1988 | Ono |
| 4,758,058 A | | 7/1988 | Cato et al. |
| 4,790,612 A | | 12/1988 | Dickson |
| 4,794,237 A | | 12/1988 | Ferrante |
| 4,800,256 A | | 1/1989 | Brookkman et al. |
| 4,904,034 A | | 2/1990 | Narayan et al. |
| 4,957,336 A | | 9/1990 | Hasegawa et al. |
| 4,973,112 A | | 11/1990 | Kramer |
| 5,124,537 A | | 6/1992 | Chandler et al. |
| 5,148,008 A | | 9/1992 | Takenaka et al. |
| 5,162,929 A | | 11/1992 | Roddy et al. |
| 5,206,491 A | | 4/1993 | Katoh et al. |
| 5,216,230 A | | 6/1993 | Nakazawa et al. |
| 5,306,899 A | | 4/1994 | Marom et al. |
| 5,331,445 A | | 7/1994 | Dickson et al. |
| 5,357,101 A | | 10/1994 | Plesko |
| 5,361,158 A | | 11/1994 | Tang |
| 5,422,744 A | | 6/1995 | Katz et al. |
| 5,471,327 A | | 11/1995 | Hall et al. |
| 5,483,075 A | | 1/1996 | Smith et al. |
| 5,495,097 A | * | 2/1996 | Katz et al. .................. 235/462 |
| 5,498,862 A | | 3/1996 | Edler |
| 5,504,595 A | | 4/1996 | Moron et al. |
| 5,550,655 A | | 8/1996 | Kayashima et al. |
| 5,555,130 A | | 9/1996 | Marom et al. |
| 5,557,093 A | | 9/1996 | Knowles et al. |

FOREIGN PATENT DOCUMENTS

| | | | | |
|---|---|---|---|---|
| JP | 53-75950 | 7/1978 | | |
| JP | 54-401849 | 8/1979 | ........... | G02B/27/17 |
| JP | 56-47019 A | 4/1981 | ........... | G02B/27/17 |
| JP | 57-192920 | 11/1982 | ........... | G02B/27/17 |

OTHER PUBLICATIONS

Holographic Bar Code Scanning by LeRoy D. Dickson, Holoscan, Inc., vol. 0, No. 0, 1994, p. 1–9.

Disk Options for the Model 2100 Holographic Scanner (Raster) by, Holoscan, Inc., 1994.

Three–Terminal Adaptive Nematic Liquid–Crystal Lens Device by Nabeel A. Riza and Michael C. DeJule, Optical Society of America, vol. 19, No. 14, 1994, p. 1013–1015.

Beamscan Models 1180, 1280, 2180 by Photon Inc., Photon, Inc., vol. 0, No. 0, 1994.

Fujitsu Slimscan by Fujitsu Systems of America, Fujitsu Systems of America, vol. 0, No. 0, 1991.

Low–Profile Holog Raphic Bar Code Scanner by LeRoy Dickson and Robert Cato, IBM Technical Disclosure Bulletin., vol. 31, No. 12, 1989, p. 205–206.

Dual–Purpose Holographic Optical Element for a Scanner by IBM Corp., IBM Technical Disclosure Bulletin, vol. 29, No. 7, 1986, p. 2892–2893.

Chromatic Correction for a Laser Diode/Holographic Deflector by G.T. Sincerbox, IBM Technical Disclosure Bulletin, vol. 27, No. 5, 1984, p. 2892–2893.

Hand–Held Holographic Scanner Having Highly Visible Locator Beam by R.T. Cato, IBM Technical Disclosure Bulletin, vol. 27, No. 4, 1984, p. 2021–2022.

Aberrant Holographic Focusing Element for Post–Objective Holographic Deflector by L. D. Dickson, IBM Technical Disclosure Bulletin, vol. 26, No. 12, 1984, p. 6687–6688.

Holography in the IBM 3687 Supermarket Scanner by LeRoy D. Dickson, et al., IBM Journal Research and Development, vol. 26, No. 2, 1982, p. 228–234.

Correction of Astigmatism for Off–Axis Reconstruction Beam Holographic Deflector by L.D. Dickson, IBM Technical Disclosure Bulletin, vol. 23, No. 9, 1981, p. 4255–4256.

Hologram Scanner for POS Bar Code Symbol Reader by Hiroyuki Ikeda, et. al., Fujitsu Scientific & Technical Journal, vol. 15, No. 1, 1979, p. 59–77.

Coupled Wave Theory for Thick Hologram Gratings by Herwig Kogelnik, The Bell System Technical Journal, vol. 48, No. 9, 1969, p. 2909–2947.

PCT International Search Report, 1995.

* cited by examiner

Warehouse Sortation

Container Loading

Bulk Package Loading